(12) United States Patent
Funayama

(10) Patent No.: US 8,115,960 B2
(45) Date of Patent: Feb. 14, 2012

(54) OVERLAY PRINTER THAT STORES FORM DATA

(75) Inventor: Kazuhiro Funayama, Fukushima (JP)

(73) Assignee: Oki Data Corporation, Tokyo (JP)

( * ) Notice: Subject to any disclaimer, the term of this patent is extended or adjusted under 35 U.S.C. 154(b) by 722 days.

(21) Appl. No.: 10/132,229

(22) Filed: Apr. 25, 2002

(65) Prior Publication Data

US 2002/0159093 A1 Oct. 31, 2002

(30) Foreign Application Priority Data

Apr. 26, 2001 (JP) ................................ 2001-129458

(51) Int. Cl.
*G06K 15/00* (2006.01)
*G06F 3/12* (2006.01)
*G06F 17/00* (2006.01)
*G06F 17/22* (2006.01)
*G06K 9/34* (2006.01)

(52) U.S. Cl. ..................... 358/1.18; 358/1.13; 358/1.15; 715/221; 715/222; 715/223; 715/224; 715/274; 382/175; 382/178

(58) Field of Classification Search ................. 358/1.18, 358/1.12, 1.13, 1.15, 1.17, 1.9, 1.16, 540; 345/619; 715/221–224, 274; 382/175, 178
See application file for complete search history.

(56) References Cited

U.S. PATENT DOCUMENTS

| | | | | | |
|---|---|---|---|---|---|
| 4,255,653 | A | * | 3/1981 | Borkat et al. ................ | 235/495 |
| 5,104,245 | A | * | 4/1992 | Oguri et al. .................. | 400/68 |
| 5,159,546 | A | * | 10/1992 | Inoue et al. .................. | 700/17 |
| 5,522,022 | A | * | 5/1996 | Rao et al. .................... | 345/440 |
| 5,587,800 | A | * | 12/1996 | Miyazaki .................... | 358/296 |
| 5,859,954 | A | | 1/1999 | Toda | |
| 5,872,640 | A | * | 2/1999 | Cohen et al. ................. | 358/434 |
| 5,920,686 | A | * | 7/1999 | Mitani ........................ | 358/1.16 |
| 6,097,498 | A | * | 8/2000 | Debry et al. ................. | 358/1.13 |
| 6,268,927 | B1 | * | 7/2001 | Lo et al. ...................... | 358/1.15 |
| 6,286,059 | B1 | * | 9/2001 | Sugiura ....................... | 710/14 |
| 6,304,336 | B1 | * | 10/2001 | Sugaya ....................... | 358/1.16 |
| 6,331,894 | B1 | * | 12/2001 | Shimizu ...................... | 358/1.13 |
| 6,348,975 | B1 | * | 2/2002 | Tsunekawa et al. ......... | 358/1.17 |
| 6,498,657 | B1 | * | 12/2002 | Kuntz et al. ................. | 358/1.15 |
| 6,501,561 | B2 | * | 12/2002 | Hayashi ...................... | 358/1.18 |
| 6,590,675 | B1 | * | 7/2003 | Tomiyasu .................... | 358/1.18 |
| 6,611,347 | B1 | * | 8/2003 | Okada et al. ................ | 358/1.15 |
| 6,734,989 | B2 | * | 5/2004 | Tsunekawa .................. | 358/1.9 |
| 2001/0035982 | A1 | * | 11/2001 | Otsubo et al. ............... | 358/462 |
| 2002/0101599 | A1 | * | 8/2002 | Okimoto et al. ............ | 358/1.13 |

FOREIGN PATENT DOCUMENTS

EP 0 849 701 A2 6/1998

* cited by examiner

*Primary Examiner* — Vincent Rudolph
(74) *Attorney, Agent, or Firm* — Panitch Schwarze Belisario & Nadel LLP

(57) ABSTRACT

A printer is provided which is capable of shortening time required to complete overlay printing. The printer includes a job controlling section to divide received data into a printer language-dependent portion being dependent on a printer language and print job information being not dependent on a printer language, a form controlling section to produce form bit-mapped data based on form information, and a bit-mapped controlling section to produce bit-mapped data representing non-form based on a result from analysis of a printer language-dependent portion and to perform overlay printing on a form and a non-form by overlaying bit-mapped data on form bit-mapped data. Since control on overlay printing is performed in accordance with form information in printing job information, the printer can be free from constraint of a printer language.

6 Claims, 14 Drawing Sheets

Fig.8

| | ITEM |
|---|---|
| A | OVERLAY LOOP COUNTER |
| B | INDIVIDUAL FORM COUNTER |

Fig.9

| SWITCH | |
|---|---|
| #1 | TO MAKE A POINTER TO MOVE FORWARD |
| #2 | TO MAKE A POINTER TO MOVE BACKWARD |
| #3 | TO MAKE AN ITEM TO MOVE FORWARD |
| #4 | TO MAKE AN ITEM TO MOVE BACKWARD |
| #5 | TO INCREMENT A COUNT |
| #6 | TO DECREMENT A COUNT |
| #7 | TO DETERMINE A COUNT |
| #8 | (NOT USED) |

Fig. 10

| POINTER | OBJECT | COUNTER OBJECT | DISPLAY OBJECT |
|---|---|---|---|
| POSITION IMMEDIATELY AFTER CREATION OF MANAGEMENT TABLE | | | |
| | OVERLAY LOOP COUNTER | "LOOP COUNTER(BEING NOT DETERMINED)"OR "LOOP COUNTER(BEING DETERMINED)" IN ALL FORM INFORMATION CONFIGURATIONS REGISTERED | LINE1:"OVERLAY COUNTER" LINE2:COUNT VALUE IN "LOOP COUNTER (BEING NOT DETERMINED)" OR "LOOP COUNTER (BEING DETERMINED)" |
| | FORM BIT-MAPPED DATA (ID1) | "FORM COUNTER(BEING NOT DETERMINED)"OR "FORM COUNTER(BEING DETERMINED)" IN FORM INFORMATION CONFIGURATIONS | LINE1:"ID1" LINE2:COUNT VALUE IN "FORM COUNTER (BEING NOT DETERMINED)" OR "FORM COUNTER (BEING DETERMINED)" |
| | FORM BIT-MAPPED DATA (ID2) | "FORM COUNTER(BEING NOT DETERMINED)"OR "FORM COUNTER(BEING DETERMINED)" IN FORM INFORMATION CONFIGURATIONS | LINE1:"ID2" LINE2:COUNT VALUE IN "FORM COUNTER (BEING NOT DETERMINED)" OR "FORM COUNTER (BEING DETERMINED)" |
| | FORM BIT-MAPPED DATA (ID3) | "FORM COUNTER(BEING NOT DETERMINED)"OR "FORM COUNTER(BEING DETERMINED)" IN FORM INFORMATION CONFIGURATIONS | LINE1:"ID3" LINE2:COUNT VALUE IN "FORM COUNTER (BEING NOT DETERMINED)" OR "FORM COUNTER (BEING DETERMINED)" |
| | ... | | |
| | FORM BIT-MAPPED DATA (IDn) | "FORM COUNTER(BEING NOT DETERMINED)"OR "FORM COUNTER(BEING DETERMINED)" IN FORM INFORMATION CONFIGURATIONS | LINE1:"IDn" LINE2:COUNT VALUE IN "FORM COUNTER (BEING NOT DETERMINED)" OR "FORM COUNTER (BEING DETERMINED)" |

FORWARD MOVEMENT →
BACKWARD MOVEMENT ←

Fig. 13

| FORM ID | AFTER INITIALIZATION | | | JOB:FIRST TIME ID1 FIRST PAGE | | | JOB:FIRST TIME ID2 FIRST PAGE | | | JOB:FIRST TIME ID2 SECOND PAGE | | | JOB:FIRST TIME ID3 FIRST PAGE | | | JOB:FIRST TIME ID3 SECOND PAGE | | | JOB:FIRST TIME ID3 THIRD PAGE | | |
|---|---|---|---|---|---|---|---|---|---|---|---|---|---|---|---|---|---|---|---|---|---|
| | ID 1 | ID 2 | ID 3 | ID 1 | ID 2 | ID 3 | ID 1 | ID 2 | ID 3 | ID 1 | ID 2 | ID 3 | ID 1 | ID 2 | ID 3 | ID 1 | ID 2 | ID 3 | ID 1 | ID 2 | ID 3 |
| LOOP COUNTER (DETERMINATION) | 2 | 2 | 2 | 1 | 2 | 2 | 1 | 2 | 2 | 1 | 1 | 2 | 1 | 1 | 2 | 1 | 1 | 2 | 1 | 1 | 1 |
| FORM COUNTER (DETERMINATION) | 1 | 2 | 3 | 1 | 2 | 3 | 1 | 1 | 2 | 1 | 2 | 1 | 1 | 2 | 2 | 1 | 2 | 1 | 1 | 2 | 3 |
| FORM COUNTER (SAVE) | 1 | 2 | 3 | 1 | 2 | 3 | 1 | 2 | 3 | 1 | 2 | 3 | 1 | 2 | 3 | 1 | 2 | 3 | 1 | 2 | 3 |
| FORM BIT-MAPPED DATA | | | | USE | | | | USE | | | USE | | | | USE | | | USE | | | USE |

| INQUIRY |
|---|
| ○ |
| ○ |
| ○ |
| ○ |
| ○ |
| ○ |
| ○ |

Fig.14

| | JOB:SECOND TIME ID1 FIRST PAGE | | | JOB:SECOND TIME ID2 FIRST PAGE | | | JOB:SECOND TIME ID2 SECOND PAGE | | | JOB:SECOND TIME ID3 FIRST PAGE | | | JOB:SECOND TIME ID3 SECOND PAGE | | | JOB:SECOND TIME ID3 THIRD PAGE | | |
|---|---|---|---|---|---|---|---|---|---|---|---|---|---|---|---|---|---|---|
| FORM ID | ID 1 | ID 2 | ID 3 | ID 1 | ID 2 | ID 3 | ID 1 | ID 2 | ID 3 | ID 1 | ID 2 | ID 3 | ID 1 | ID 2 | ID 3 | ID 1 | ID 2 | ID 3 |
| LOOP COUNTER (DETERMINATION) | 0 | 1 | 1 | 0 | 1 | 1 | 0 | 0 | 1 | 0 | 0 | 1 | 0 | 0 | 1 | 0 | 0 | 0 |
| FORM COUNTER (DETERMINATION) | 0 | 2 | 3 | 0 | 1 | 3 | 0 | 0 | 3 | 0 | 0 | 2 | 0 | 0 | 1 | 0 | 0 | 0 |
| FORM COUNTER (SAVE) | 1 | 2 | 3 | 1 | 2 | 3 | 1 | 2 | 3 | 1 | 2 | 3 | 1 | 2 | 3 | 1 | 2 | 3 |
| FORM BIT-MAPPED DATA | USE | | | USE | USE | | | USE | | | | USE | | | USE | | | USE |
| INQUIRY | | ○ | | | ○ | | | ○ | | | | ○ | | | ○ | | | |

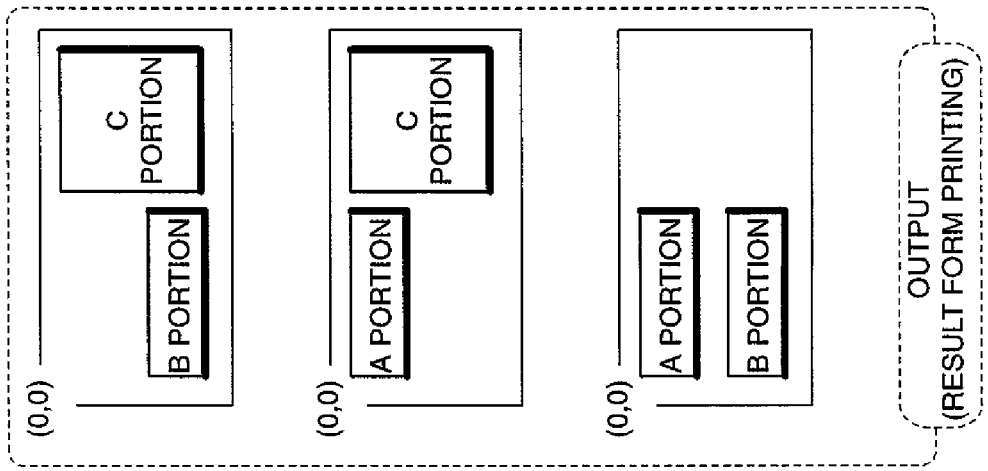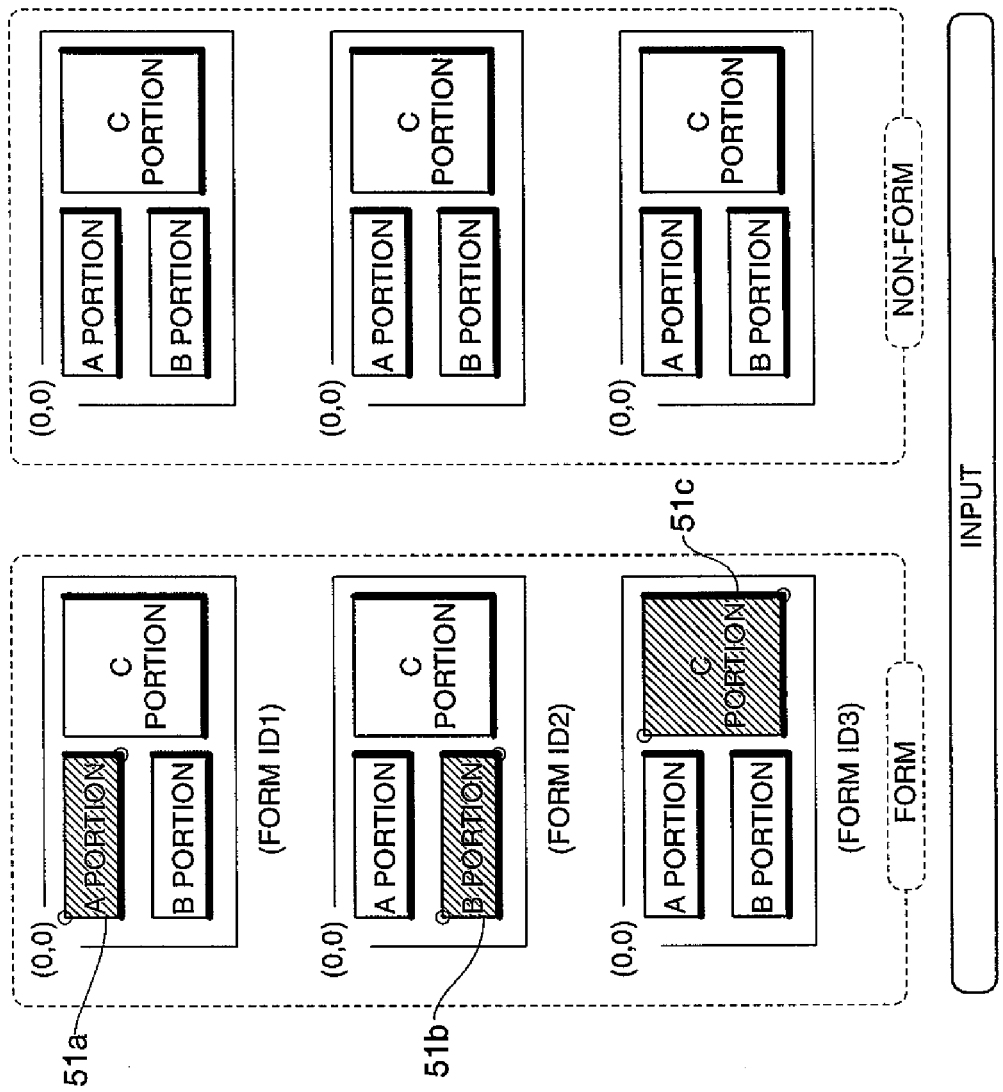

OVERLAY PRINTER THAT STORES FORM DATA

BACKGROUND OF THE INVENTION

1. Field of the Invention

The present invention relates to a printer.

2. Description of the Related Art

Conventionally, in a process of printing a fixed format, in order to do printing at a high speed, a portion to be repetitively printed being made of commonly-printed portions including a name of a firm, a ruled line, or a like is transmitted and is registered in advance as a "form" from a high-order device to a printer and a non-repetitive portion to be printed being made of non-repetitive portions including an address, a name, an amount or a like is transmitted independently from the form as a "non-form" and the form is overlaid on the non-form to do printing in the printer.

Therefore, in the conventional printer, by using a printer language having a macro function to register the form and by performing simultaneous processes of both the registered form and the non-form, overlay printing is done.

However, in the above conventional printer, not only the printer language to be used for the form and the printer language to be used for the non-form have to be the same, but also, whenever printing is done, an analysis of a command and expansion of the form to bit-mapped data are necessary and, as a result, time required to complete printing is made longer.

Moreover, to solve this problem, use of the printer language having no macro function may be possible, however, in that case, since, whenever printing is required, it is necessary to transmit the form and non-form, from a high-order device to the printer, the receipt and analysis of a command of a form and expansion to bit-mapped data are required, which causes the time required to complete printing to be made further longer.

SUMMARY OF THE INVENTION

In view of the above, it is an object of the present invention to provide a printer which is capable of shortening time required to complete overlay printing.

According to a first aspect of the present invention, there is provided a printer including:

a job controlling section to divide received data into a printer language-dependent section being dependent on a printer language and print job information being not dependent on the printer language;

a form controlling section to produce form bit-mapped data based on form information and store the form bit-mapped data; and a bit-mapped controlling section to produce bit-mapped data representing a non-form based on a result of analysis conducted by the printer language-dependent section and to perform overlay printing of a form and a non-form by overlaying the bit-mapped data on the form bit-mapped data being stored.

In the foregoing, the form information is contained in print job information.

Also, a preferable mode is one wherein the form information is set by manipulating an operation section.

Also, a preferable mode is one wherein the bit-mapped controlling section deletes a bit-mapped data corresponding to a region to be printed which is designated by the form information.

With the above configurations, since control on overlay printing is performed in accordance with form information in printing job information, the printer can be free from constraint of a printer language. Therefore, it is possible to do overlay printing irrespective of a macro function. The printer language to be used for the form can be different from that to be used for the non-form. Moreover, since a form is registered as form bit-mapped data and is controlled by form controlling section, receipt and analysis of a command for form information and development to bit-mapped data is not required for every printing, which enables time required to complete overlay printing to be shortened.

BRIEF DESCRIPTION OF THE DRAWINGS

The above and other objects, advantages and features of the present invention will be more apparent from the following description taken in conjunction with the accompanying drawings in which:

FIG. 8 is a diagram items according to the second embodiment of the present invention;

FIG. 9 is a diagram explaining a switch function according to the second embodiment of the present invention;

FIG. 10 is a diagram showing a management table according to the second embodiment of the present invention;

FIG. 13 is a first diagram showing changes of form information configurations according to the third embodiment of the present invention;

FIG. 14 is a second diagram showing changes of form information configurations according to the third embodiment of the present invention;

FIG. 18 is a diagram illustrating a form, a non-form and a printing result of the fourth embodiment of the present invention.

DESCRIPTION OF THE PREFERRED EMBODIMENTS

Best modes of carrying out the present invention will be described in further detail using various embodiments with reference to the accompanying drawings.

First Embodiment

Figure 1:
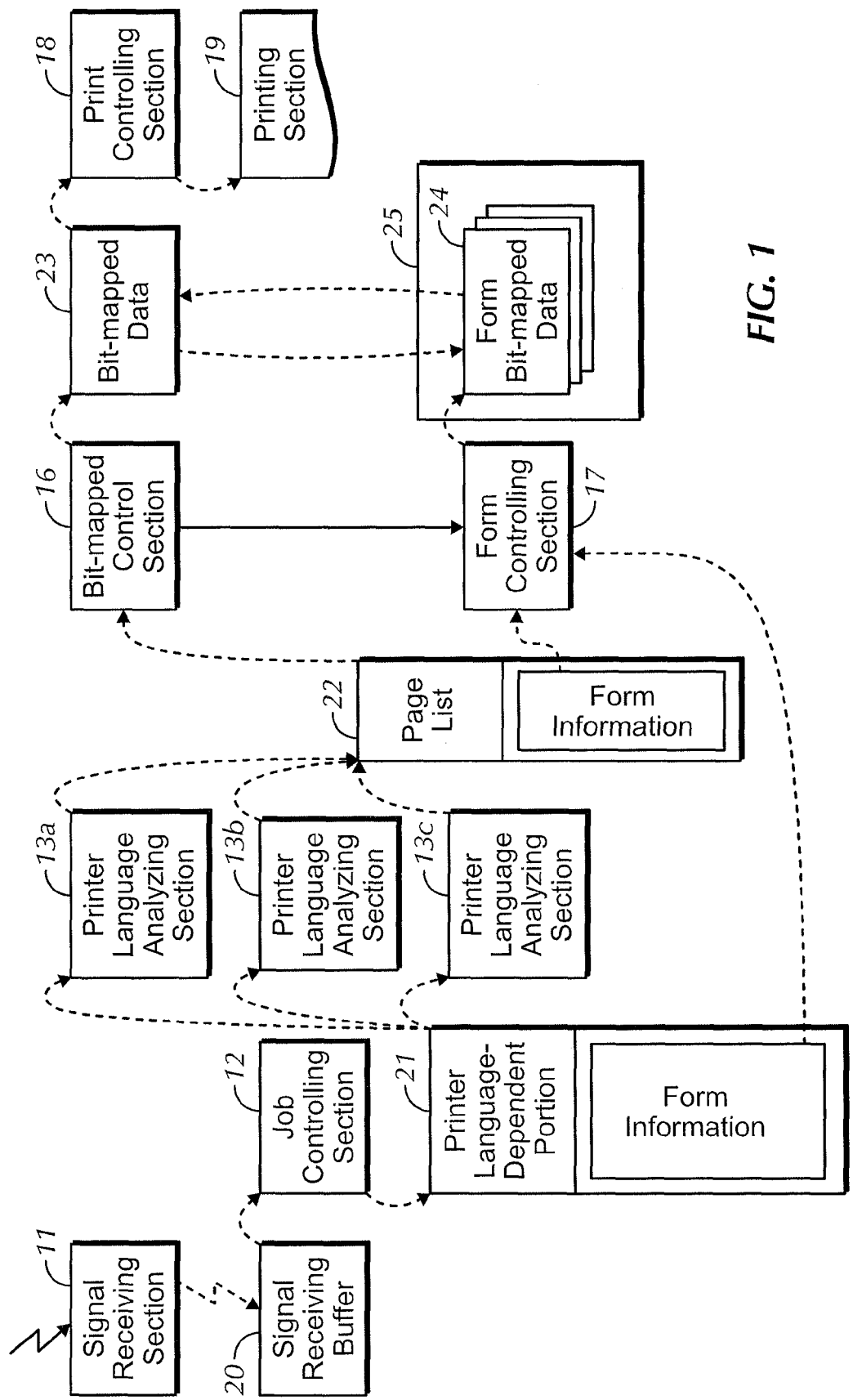
FIG. 1 is a schematic block diagram showing configurations of a printer according to a first embodiment of the present invention.
Figure 2:
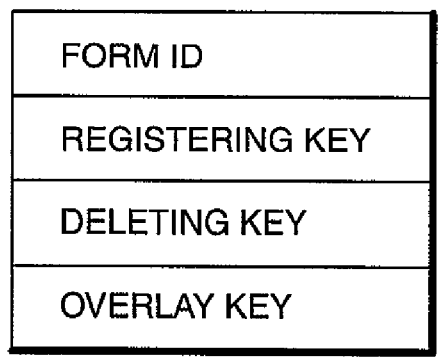
FIG. 2 is a diagram showing a configuration of form information according to the first embodiment of the present invention.
Figure 3:
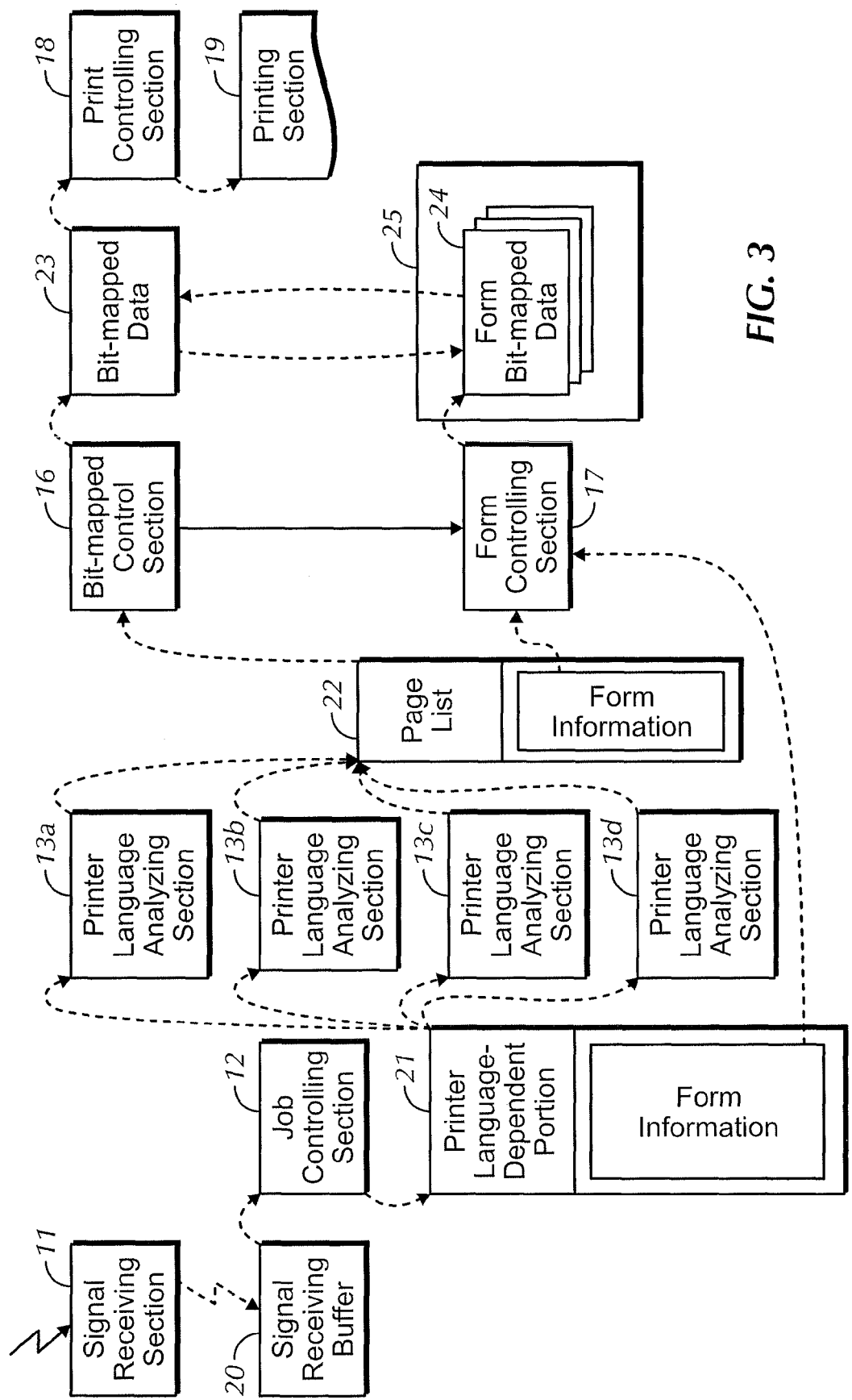
FIG. 3 is a block diagram showing a modified example of the printer of the first embodiment of the present invention.

FIG. 1 is a schematic block diagram showing configurations of a printer of a first embodiment of the present invention. FIG. 2 is a diagram showing a configuration of form information according to the first embodiment of the present invention. FIG. 3 is a block diagram showing a modified example of the printer of the first embodiment of the present invention.

In FIG. 1, the printer of the first embodiment includes a signal receiving section 11 to receive data transmitted from a higher-order device, a signal receiving buffer 20 to store received data, a job controlling section 12 to control received data as a job, a printer language-dependent portion 21, printer language analyzing sections 13A to 13C, a page list 22, a bit-mapped control section 16 to produce bit-mapped data 23, a print controlling section 18 to transmit the bit-mapped data 23 to a printing section 19, a form controlling section 17 to control form information, and a form bit-mapped data 24.

The configuration of the form information is set at a time of registering a form. As shown in FIG. 2, the form information includes a form ID used to identify a specified form, a registering key used to make a request for registration of a form, a deleting key used to make a request for deleting a form, and an overlay key used to make a request for overlay printing of a form and a non-form.

Next, operations of the printer having configurations described above will be explained below.

First, data transmitted from the high-order device is received by the signal receiving section 11 and is stored in the signal receiving buffer 20. Then, the data is divided by the job controlling section 12 into a printer language-dependent portion 21 representing a content of a form in a job or a content of a non-form in the job and being dependent on a printer language and a print job information portion representing entire information of the job and having form information and being not dependent on the printer language.

Then, the printer language-dependent portion 21 is analyzed by specified printer language analyzing sections 13A and 13C and is converted to the page list 22 based on a result from the analysis. At this point, the printer job information is sent simultaneously to the printer language analyzing sections 13A to 13C. Then, the bit-mapped controlling section 16 expands the page list 22 to the bit-mapped data 23. Thus, based on a result from an analysis by the printer language analyzing sections 13A to 13C, the page list 22 is produced and, based on the page list 22, bit-mapped data 23 representing a form or a non-form is produced.

Next, operations of the form controlling section 17 used to register a form will be described.

First, the bit-mapped controlling section 16 makes an inquiry of the form controlling section 17 about form information and a reference to the form information configuration shown in FIG. 2. The form controlling section 17, while a registering key is on, handles the bit-mapped data 23 representing a form obtained by expansion, based on the page list 22 as form bit-mapped data 24 and registers it, together with a form ID, in the storing section 25. Thus, the form bit-mapped data 24 can be produced based on the form information.

Next, operations of overlay printing of a form and a non-form will be explained.

First, the bit-mapped controlling section 16 makes an inquiry of the form controlling section 17 about the form information and a reference to the form information configurations shown in FIG. 2. The form controlling section 17, when the overlay key is on, searches for the form bit-mapped data 24 having a same ID form out of the form bit-mapped data 24 and transmits the form bit-mapped data 24 obtained by searching to the bit-mapped controlling section 16.

Then, the bit-mapped controlling section 16 produces overlay data by overlaying bit-mapped data representing a non-form being expanded based on the page list 22 on the form bit-mapped data 24 representing a form transmitted from the form controlling section 17 and transmits the produced data to the overlay data to the print controlling section 18. The print controlling section 18 transmits the overlay data to the printing section 19 in the printer and does overlay printing on a printing medium.

Next, operations of normal printing are explained.

First, the bit-mapped controlling section 16 makes an inquiry of the form controlling section 17 about form information and a reference is made to the configuration of the form information shown in FIG. 2. Then, the form controlling section 17, when any key is not on, recognizes that no overlay printing of the form and non-form and transmits the recognized information to the bit-mapped controlling section 16.

Then, the bit-mapped controlling section 16 transmits the bit-mapped data 23 obtained by being expanded by the page list 22, as it is, to the print controlling section 18. The print controlling section 18 transmits the bit-mapped data 23 to the printing section 19 and prints it on a printing medium.

Next, operations of deleting a form will be described.

First, when form information is recognized by the job controlling section 12, the bit-mapped controlling section 16 makes an inquiry of the form controlling section 17 about the form information. The form controlling section 17 makes a reference to the form information configuration as shown in FIG. 2 and, when a deletion key is on, searches on the form bit-mapped data 24 having a same form ID out of the form bit-mapped data 24 registered on the storing section 25 and deletes the form bit-mapped data 24 obtained by the searching process.

Thus, in the first embodiment, since the received data is divided into a printer language-dependent portion 21 and print job information not being dependent on the printer language and since control on the overlay printing is performed by a bit-mapped data generated according to the form information in the printing job information, there is no constraint of a printer language. Therefore, it is possible to do overlay printing irrespective of existence or non-existence of a macro function. Moreover, it is not necessary that the printer language being used for a form is the same as the printer language being used for a non-form.

Then, since the form is registered as the form bit-mapped data 24 and is managed and controlled by the form controlling section 17, receipt and analysis of a command contained in the form information and expansion of it to the bit-mapped data 23 are not required whenever printing is done and, therefore, time required to complete the overlay printing can be shortened.

Then, even if a printer language analyzing section 13D is newly placed as shown in FIG. 3, since this function does not depend on the printer language, the printer language analyzing section 13D can be used for ordinary printing or can be used for overlay printing.

Second Embodiment

Figure 4:
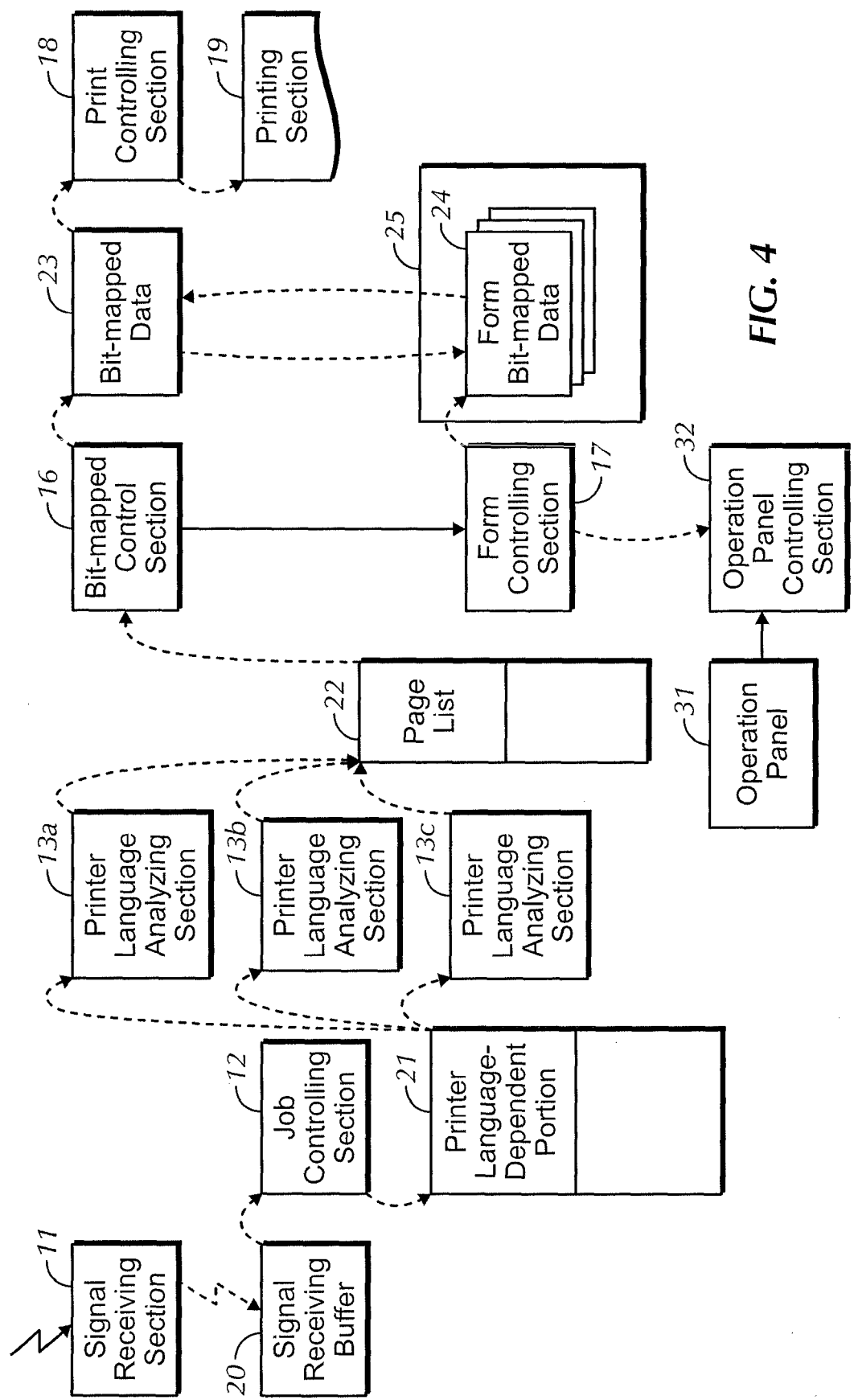
FIG. 4 is a schematic block diagram showing configurations of a printer of a second embodiment of the present invention.

FIG. 4 is a schematic block diagram showing configurations of a printer of a second embodiment of the present invention. In FIG. 4, same reference numbers are assigned to corresponding parts having same functions as those in the first embodiment.

In this case, the printer has newly an operation panel 31 as an outside input/output device to be used to make setting for the printer and an operation panel controlling section 32 used to control information input by manipulation of the operation panel 31. Then, the form controlling section 17 controls a form by referring, through the operation panel controlling section 32, to each of switches being put in a pressed-down state in the operation panel 31.

Figure 5:
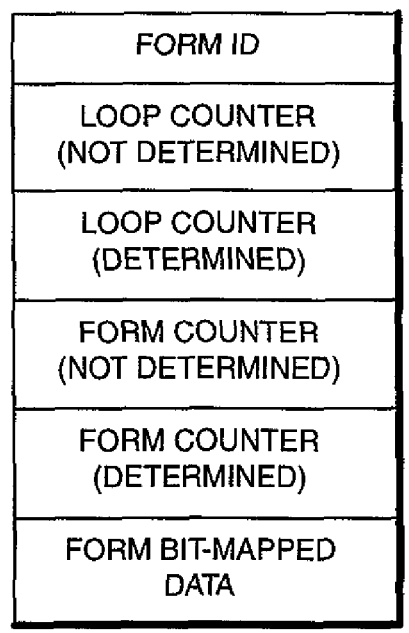
FIG. 5 is a diagram showing configurations of form information according to the second embodiment of the present invention.

FIG. 5 is a diagram showing configurations of form information according to the second embodiment. The configuration of the form information includes a form ID, a loop counter (being not determined) and another loop counter (determined) set by the operation panel 31 (see FIG. 4) as an operation section and is used to store the number of times of jobs done by using the form, a form counter (being not determined) set by the operation panel 31 and is used to store the number of times in which each form is used in every job, a form counter (being determined), and form bit-mapped data.

Figure 6:
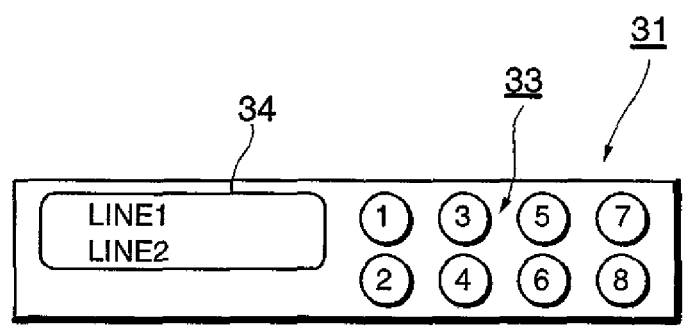
FIG. 6 is a diagram showing an example of an operation panel according to the second embodiment of the present invention.

FIG. 6 is a diagram showing an example of an operation panel of the second embodiment. As shown in FIG. 6, the operation panel 31 includes toggle switches made up of 8 pieces of switches #1 to #8 and an LCD (Liquid Crystal Display) screen 34 serving as a display section adapted to display 2 lines of character strings Line 1 and Line 2.

Next, operations of setting form information by operating the operation panel 31 and of setting overlay printing will be described. Moreover, let it be presumed that a plurality of forms having such form information configurations as shown in FIG. 5 is registered on a storing section 25.

Figure 7:
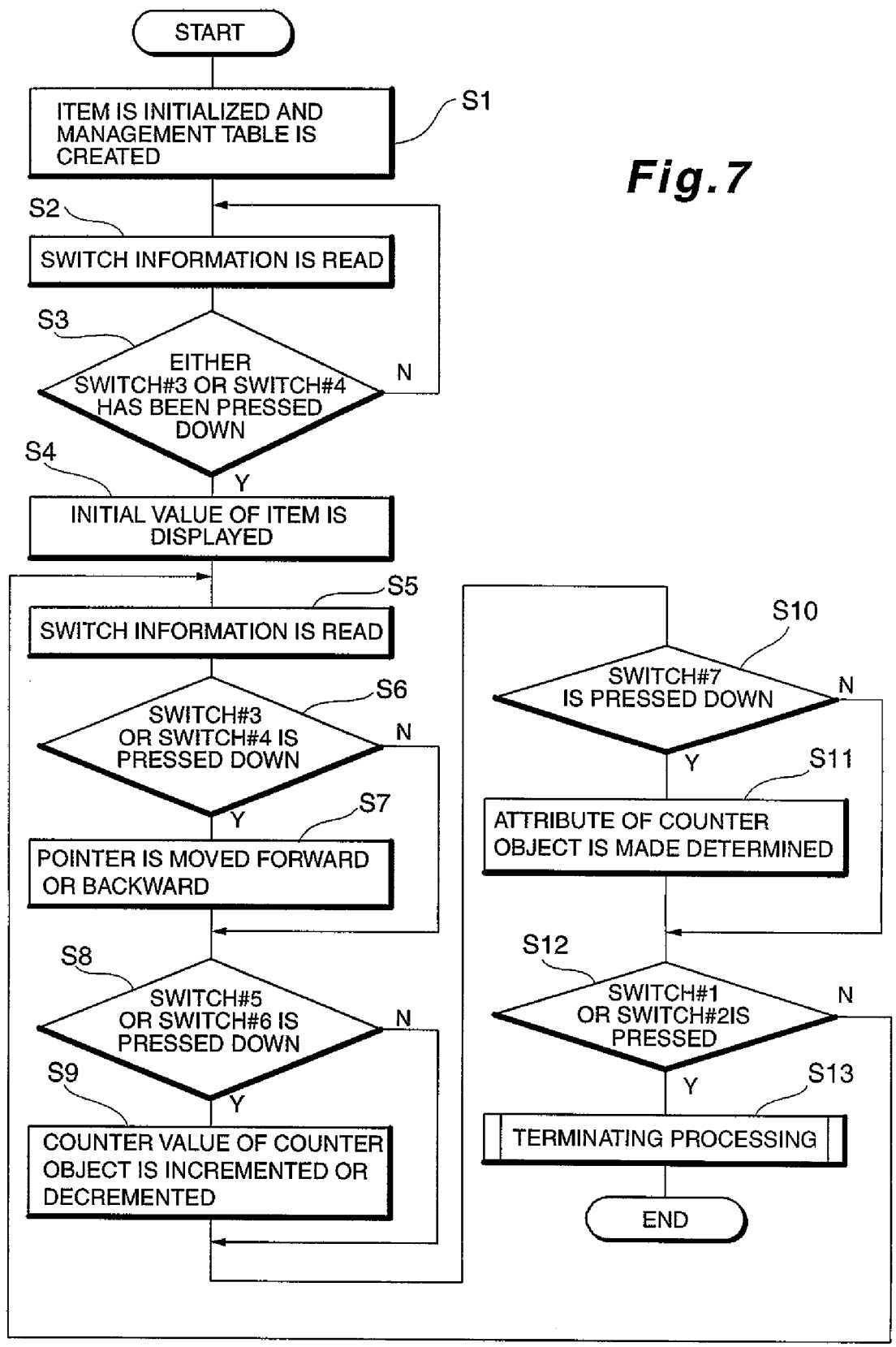
FIG. 7 is a flow chart illustrating an operation of the printer according to the second embodiment of the present invention.

FIG. 7 is a flow chart illustrating an operation of a printer of the second embodiment. FIG. 8 is a diagram showing items employed in the second embodiment. FIG. 9 is a diagram explaining a switch function of the second embodiment. FIG. 10 is a diagram showing a management table employed in the second embodiment.

First, as shown in FIG. 8, two items are provided which can be set by manipulating the operation panel 31 (FIG. 6) including an overlay loop count (A) and an individual form count (B). The overlay loop count (A) represents the number of times of using all forms in one job and the individual form count (B) represents the number of times of using each form in one job.

In the form schedule intended to print two pieces of prints in which three forms ID1 to ID3 are registered and the form ID1 is used three times in every job, the form ID2 is used five times in every job, and the form ID3 is used seven times in every job. When overlay printing is designated by manipulating the operation panel 31, the overlay loop count (A) is set to be "2" and the individual form count (B) is set to be "3" in the case of the form ID1 and is set to be "5" in the case of the form ID2 and is set to be "7" in the case of the form ID3.

The printer of the embodiment is so configured that a category of a printer attribute can be changed by operating the operation panel 31. As shown in FIG. 9, each of functions is assigned to each of toggle switches 33 and an operator selects a category required for setting for overlay printing in each of categories by pressing either of a switch #1 or a switch #2. At this point, a character such as "overlay setting" or a like is displayed as a character string Line 1 on an LCD screen 34.

Next, operations of a printer to be performed after the selection of setting for "overlay printing" has been completed will be described.

When the selection of the setting for "overlay printing" is completed, the form controlling section 17 (FIG. 4) initializes an item and creates a management table for the item. The management table has the contents as shown in FIG. 10. As objects, the overlay loop count and form bit-mapped data 24 (Forms ID1 to ID$_n$) are arranged at a same level. A pointer to point to one object is placed in the management table, which points to an overlay loop count immediately after the selection of setting for overlay printing has been completed. Each object has a counter object as a member (that is, as an element) and has a display object on the LCD screen 34.

Moreover, the counter object has two states of being not determined and being determined as attributes in an exclusive manner. When the attribute is put in a "state of being not determined", an object to be processed in the loop counter and form counter is "xxx counter (being not determined)". When the attribute is put in a "state of being determined", an object to be processed in the loop counter and form counter is "xxx counter (being determined)". Moreover, when the management table is initialized, the loop counter and the form counter are then initialized, a count value on each of "xxx counters (determined)" is copied onto a "xxx counter (determined)".

Moreover, immediately after completion of the selection of setting for overlay printing, a character of the "overlay setting" selected as a category remains displayed on the LCD screen 34. Then the form controlling section 17 judges whether or not the switch #3 or switch #4 is pressed down and, if it has been pressed down, processing is performed as an object of an overlay loop count being an initial value. That is, the form controlling section 17 asserts a counter object being a member (element) of an object, that is, the counter object is to be processed and the display object on the LCD screen 34 is transmitted to the LCD display processing section and displays it on the LCD screen 34. The attribute of the counter object is now put into a state of being determined.

Then, after the initialization has been completed, the form controlling section 17 is operated to refer to the switch information and to perform processing according to specifications of each of the toggle switches 33.

Next, operations to select an item will be explained.

When either of the switch #3 or #4 is pressed down, the form controlling section 17 updates an item. In this case, the pressed-down toggle switch #33 causes a pointer used to point to an object of the management table to move forward or to move backward (moreover, a management table is handled as a loop table). Also, the toggle switch #33 asserts the counter object being a member of a specified object, that is, makes the counter object be an object to be processed and then transmits the display object on the LCD screen 34 to the LCD display processing section and displays it on the LCD screen 34. In this case, an attribute of the counter object is put in a state of "being not determined".

Next, operations of updating (not being determined) a counter value of the loop counter and form counter will be described.

First, when the switch #3 or the switch #4 is pressed down, the form controlling section 17 asserts the counter object being a member of a specified object, that is, makes the counter object be an object to be processed and causes an attribute of the counter object to be put in a state being not determined. When the switch #5 or the switch #6 is pressed down, a count value of the counter object increments or decrements. Next, the form controlling section 17 transmits the display object of the LCD screen 34 to the LCD display processing section and displays it on the LCD screen 34.

Next, operations of updating (that is, determining) a counter value will be explained.

First, when the switch #7 is pressed down, the form controlling section 17 asserts the counter object being a member of a specified object, that is, makes the counter object be an object to be processed and puts an attribute of the counter object in a state of being determined. Then, at this point, a set counter value is registered on an object and copies a counter value of the "xxx counter (not being determined) onto the "xxx counter (being determined). Then, the form controlling section 17 transmits the display object on the LCD screen to the LCD display processing section and displays it on the LCD screen 34.

Next, termination processing will be described below.

First, the form controlling section 17, when either of the switch #1 or the switch #2 is pressed down, performs termination processing and terminates the setting for overlay printing to proceed to another category and, when an attribute of the counter project is put in a state being not determined, determines the attribute.

Thus, according to the embodiment, when a form is registered in advance in a storing section 25 of a printer, the overlay printing can be done by setting the form by manipulating the operation panel 31 to make the setting for overlay printing. Therefore, even if control on a form is made impossible by a high-order device since the form has been created by a highly-functional printer language, the overlay printing is possible by manipulating the operation panel 31 to select a proper form.

Moreover, when the function of setting for the overlay printing is assigned as a function of a job, since a form can be selected by making setting for the overlay printing by a high-order device, which enables the overlay printing.

Next, the flow chart in FIG. 7 will be explained.

Step S1: An item is initialized and a management table is created.
Step S2: Switch information is read.
Step S3: Whether or not the switch #3 or the switch #4 has been pressed down is judged. When either of the switch #3 or the switch #4 has been pressed down, the routine proceeds to Step S4 and, if neither the switch #3 nor the switch #4 has been pressed down, the routine returns to Step S2.
Step S4: An initial value of an item is displayed.
Step S5: Switch information is read.
Step S6: whether or not the switch #3 or the switch #4 has been pressed down is judged. When either of the switch #3 or the switch #4 has been pressed down, the routine proceeds to Step S7 and when neither the switch #3 nor the switch #4 has been pressed down, the routine returns to Step S8.
Step S7: The pointer is moved forward or backward.
Step S8: Whether or not the switch #5 or the switch #6 has been pressed down is judged. When either of the switch #5 or the switch #6 has been pressed down, the routine proceeds to Step S9 and, if neither the switch #5 nor the switch #6 has been pressed down, the routine returns to Step S10.
Step S9: The counter of the counter object is incremented or decremented.
Step S10: Whether or not the switch #7 has been pressed down is judged. When either of the switch #7 has been pressed down, the routine proceeds to Step S11 and, if the switch #7 has not been pressed down, the routine proceeds to Step 12.
Step S11: An attribute of the counter object is determined.
Step S12: Whether or not the switch #1 or the switch #2 has been pressed down is judged. When either of the switch #1 or the switch #2 has been pressed down, the routine proceeds to Step S13 and, if neither the switch #1 nor the switch #2 has been pressed down, the routine returns to Step S5.
Step S13: Terminating processing is performed to end the routine.

Third Embodiment

Since configurations of a printer of a third embodiment are the same as those in the second embodiment, its description will be made by referring to FIG. 4.

Figure 11:
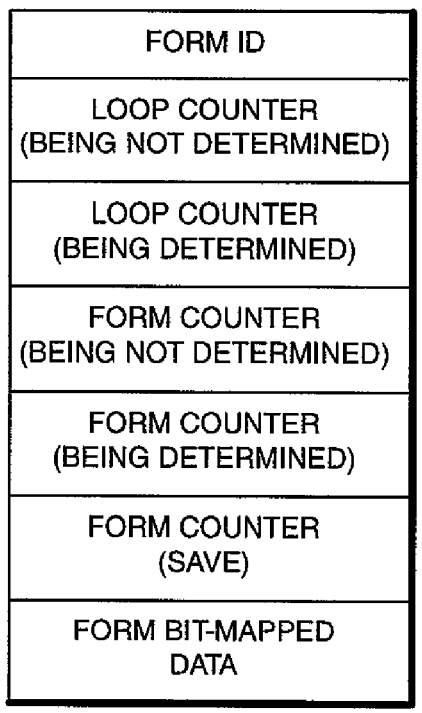
FIG. 11 is a diagram illustrating a form information configuration according to the third embodiment of the present invention.

FIG. 11 is a diagram illustrating a form information configuration according to the third embodiment of the present invention.

In this case, as shown in FIG. 11, a form counter (save) is added to a configuration of the form information of the second embodiment and the number of times when each form is used is saved in the form counter.

Figure 12:
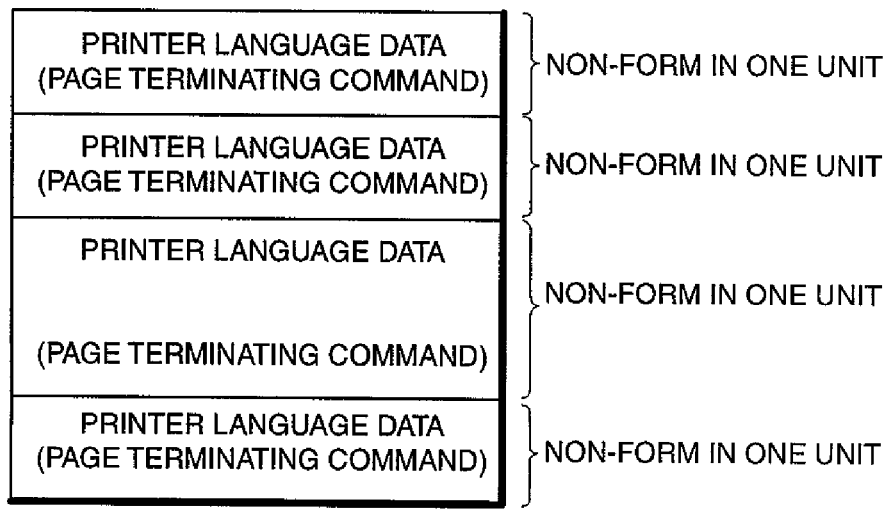
FIG. 12 is a diagram showing printer language data of non-form according to the third embodiment of the present invention.

FIG. 12 is a diagram showing printer language data of non-form according to the third embodiment of the present invention.

Since some printer languages do not have conception of a job in some cases, as shown in FIG. 12, data sandwiched between page terminating commands (alignment page command, ejection command, or a like) is handled as printer language data of non-form in one unit.

Moreover, since the page list (FIG. 4) is produced for every one-unit non-form, the bit-mapped controlling section 16 expands the page list 22 into the bit-mapped data 23 for every one-unit non-form and, at this time, the bit-mapped controlling section 16 makes an inquiry of the form controlling section 17 about the form information. Then, as shown in FIG. 11, the form controlling section 17 makes a reference to a registered loop counter and to a form counter and transmits the form to the bit-mapped controlling section 16. The bit-mapped controlling section 16 produces overlay data by overlaying the bit-mapped data 23 representing a non-form being developed based on the page list 22 on the form bit-mapped data 24 and transmits the overlay data representing a form being transmitted from the form controlling section 17 to the print controlling section 18. The print controlling section 18 transmits the overlay data to the printing section 19 and do overlay printing on a printing medium.

Next, for example, a case in which three forms ID1 to ID3 are registered and 2 pieces of overlay-printed matters are produced by manipulating the operation panel 31 and by using the form ID1 once for every job, the form ID2 twice for every job, and the form ID3 three times for every job, will be explained.

FIG. 13 is a first diagram showing changes of form information configurations according to the third embodiment. FIG. 14 is a second diagram showing changes of form information configurations according to the third embodiment.

First, in FIG. 13, the counter object being a member of an object has a loop counter (determination), a form counter (determination), a form counter (save), and form bit-mapped data. The mark "○" denotes a form about which an inquiry is made by the bit-mapped controlling section 16 and the characters "USE" denote a form which is transmitted from the form controlling section 17 to the bit-mapped controlling section 16.

In this case, since 2 pieces of overlay-printed matters are produced, after initialization, each of the loop counters (determination) for the forms ID1 to ID3 becomes 2. Moreover, since the form ID1 is used for one job once, the form ID2 is used for one job twice, and the form ID3 is used for one job three times, after initialization, each of the form counter (determination) for the form ID1 to the form ID3 is set to be 1 to 3. Each of the form counters (save) for the forms ID1 to ID3 remains 1 to 3, after initialization and until the overlay printing is completed.

Then, after initialization, an inquiry about a specified form out of the forms ID1 to ID3 is made and, while the form bit-mapped data 24 (FIG. 4) representing the form is transmitted from the form controlling section 17 to the bit-mapped control section 16, the loop counter (determination) of the above form decrements and the form counter (determination) of the above form becomes 1 and then the loop counter increments and all the counter values of all the loop counter (determination) become 1. Then, when the counter value of the form counters for the forms ID1 to ID3 becomes equal to the counter value for the form counter (save), a first time job is completed. Next, the second time job starts and a counter value of the loop counter (determination) for the form and a counter value for the form counter (determination) decrements. When each counter value of all the loop counters (determination) and all the form counters (determination) for the forms ID1 to ID3 becomes "0", the second time job ends.

Each counter value of all the loop counters (determination) and of all the form counters (determination) becomes 0, the overlay printing is terminated.

Thus, according to the printer of the embodiment, since a form is set by manipulating the operation panel 31 in the printer, even if form control on the non-form is impossible, overlay printing can be done.

Fourth embodiment

In the fourth embodiment, same reference numbers are assigned to corresponding parts having the same functions as those in the first embodiment.

Figure 15:
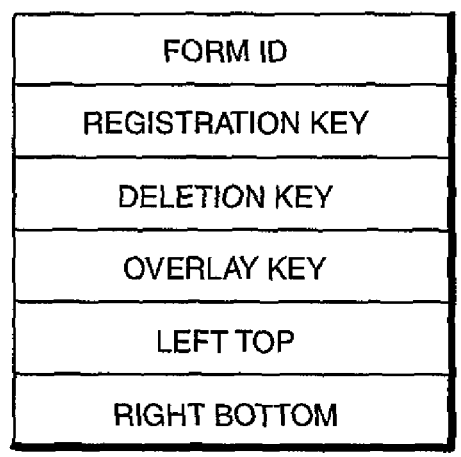
FIG. 15 is a diagram showing a form information configuration according to a fourth embodiment of the present invention.
Figure 16:
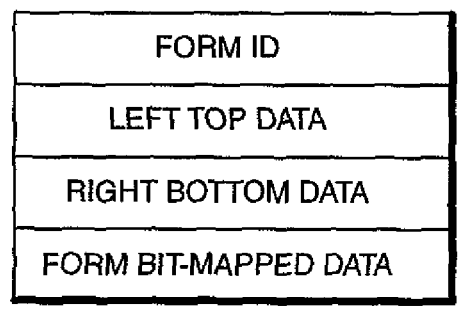
FIG. 16 is a diagram showing configurations of form bit-mapped data according to the fourth embodiment of the present invention.

FIG. 15 is a diagram showing a form information configuration according to a fourth embodiment. FIG. 16 is a diagram showing configurations of form bit-mapped data according to the fourth embodiment.

As shown in FIG. 15, the form information configuration includes a form ID to identify a form, a registration key used to make a request for registration, a deletion key used to make a request for deletion, and an overlay key used to make a request for overlay printing. It also has an attribute of a left top and a right bottom to show a printing area of non-form portion to be printed of the form.

As shown in FIG. 16, a data configuration of the form bit-mapped data is made up of a form ID, left top data, right bottom data, and form bit-mapped data being actual form data.

Next, operations of the printer having configurations as above will be explained.

Figure 17:
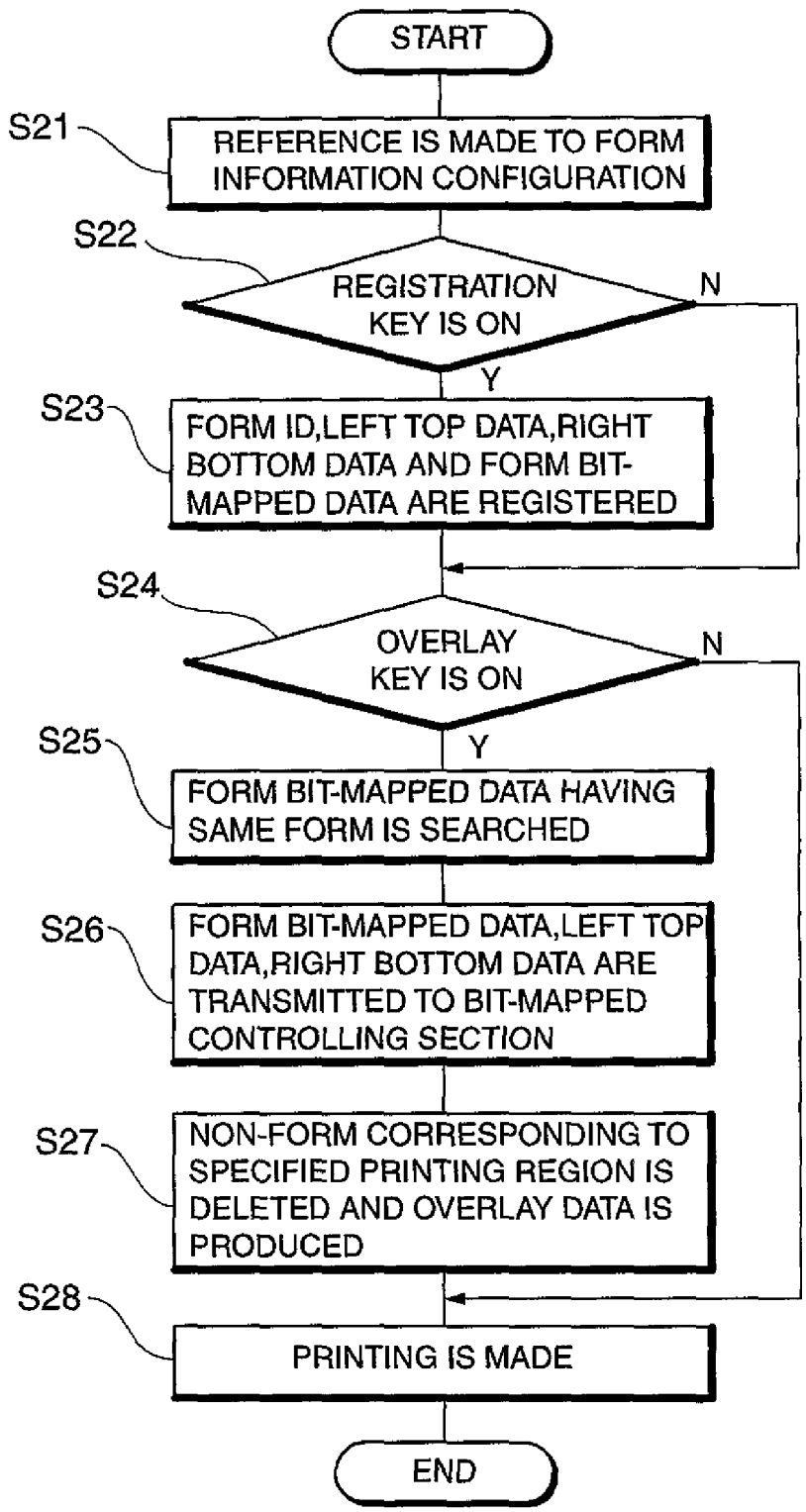
FIG. 17 is a flowchart showing operations of the printer according to the fourth embodiment of the present invention.

FIG. 17 is a flowchart showing operations of the printer of the fourth embodiment. FIG. 18 is a diagram illustrating a form, a non-form and a result from printing of the fourth embodiment.

First, data transmitted from a high-order device is received by a signal receiving section 11 (FIG. 1) and is stored in the signal receiving buffer 20. In the job controlling section 12, the data is divided into a printer language-dependent portion 21 representing a content of a form and a content of a non-form in a job and being dependent on a printer language and print job information portion representing information about an entire job and being provided with form information and being not dependent on the printer language.

Then, the printer language-dependent portion 21 is analyzed by a specified printer language analyzing section 13A to 13C and is converted into a page list 22 based on a result from analysis.

At this point, the print job information is simultaneously transmitted to the printer language analyzing section 13A to 13C. Then, the bit-mapped controlling section 16 expands the page list 22 to the bit-mapped data 23.

Next, operations of the form controlling section 17 to register the form will be described.

First, the bit-mapped controlling section 16 makes an inquiry of the form controlling section 17 about the form information and makes a reference to the form information configuration shown in FIG. 15. Then, the form controlling section 17, when the registration key is on, handles the bit-mapped data 23 as the form bit-mapped data 24 and registers it together with the form ID, left top data, and right bottom data on the storing section 25. The A portion, B portion and C portion are printing regions shown in FIG. 18.

Next, operations of overlaying a form on a non-form will be described below.

First, the bit-mapped controlling section 16 makes an inquiry of the form controlling section 17 about the form information and makes a reference to the form information configuration shown in FIG. 15. Then, the form controlling section 17, when the overlay key is on, searches for the form bit-mapped data 24 having the same form ID out of the form bit-mapped data 24 and then transmits the searched form bit-mapped data 24 to the bit-mapped controlling section 16. At this point, the left top data and right bottom data are added to the form bit-mapped data 24 and is then transmitted.

Then, the bit-mapped controlling section 16, in the bit-mapped data 23 representing the non-form expanded based on the page list 22, deletes these bit-mapped datum corresponding to each of a printing region 51a (A portion in the form D1), 51b (B portion in the form ID2), and 51c (C portion in the form ID3) that has been designated by the left top data and right bottom data. After, the bit-mapped controlling section 16 produces overlay data by overlaying the bit-mapped data 23 on the form bit-mapped data 24 and then transmits the overlay data to the print controlling section 18. In other way, it is possible that after a overlay data is produced, the bit-mapped data corresponding to the printing region is deleted from the overlay data. The print controlling section 18 transmits the overlay data to the printing section 19 and performs overlay printing on a printing medium.

Thus, each of the printing regions 51a to 51c for every form ID1 to ID3 can be designated and a bit-mapped data corresponding to each of the designated printing regions 51a to 51c can be deleted and, therefore, even if the same data is received, a part of the printing of the bit-mapped data in a unit of a form can be omitted. In this example, only one place of the printing regions 51a to 51c is designated, however, a plurality of places may be designated.

Furthermore, it is possible that using a form data which does not contain the information about non-printing region, then designating the form data and the non-printing region by a command sent with a non-form data. In this case, because one form data is used only, so the using volume for a memory may be reduced.

Next, the flowchart shown in FIG. 17 is explained below.
Step S21: A reference is made to the form information configuration.

Step S22: Whether or not a registration key is on is judged. If the registration key is on, the routine proceeds to Step 23 and if it is not on, the routine proceeds to Step S24.

Step S23: The form ID, left top data, right bottom data, and form bit-mapped data 24 are registered.

Step S24: Whether or not the overlay key is on is judged. If the overlay key is on, the routine proceeds to Step S25 and, if the overlay key is not on, the routine proceeds to Step S28.

Step S25: The form bit-mapped data 24 having the same form ID is searched for.

Step S26: The form bit-mapped data 24, left top data, right bottom data are transmitted to the bit-mapped controlling section 16.

Step S27: The bit-mapped data corresponding to a specified printing region is deleted and the overlay data is produced.

Step S28: Printing is made and processing is terminated.

It is apparent that the present invention is not limited to the above embodiments but may be changed and modified without departing from the scope and sprit of the invention.

What is claimed is:

1. A method of printing data by a printer, the method comprising the steps of:
   (a) storing a form data including information designating one or more non-printing regions, said non-printing regions corresponding to regions of a form in which non-form data are not to be printed;
   (b) receiving the printing data, the printing data including: (1) ID information for identifying the stored form data, and (2) the non-form data;
   (c) retrieving the stored form data based on the received ID information;
   (d) overlaying the retrieved form data and the non-form data;
   (e) deleting non-blank non-form data that would be printed in the designated non-printing regions of the form, wherein the non-blank non-form data is a part of the non-form data;
   (f) forming overlay data, the overlay data comprising the non-form data that was not deleted in step (e); and
   (g) printing the overlay data.

2. The method of claim 1, wherein the received printing data is in the form of a printer language and the method further includes the step of converting the received printing data in the printer language to bit-map data.

3. The method of claim 2, further including the step of receiving the form data from a high order source and storing the form data in the printer along with an ID corresponding to the form data if the received printing data includes a registration key.

4. The method of claim 3, further including the step of converting the form data in the printer language to bit-map data prior to storing the received form data if the received form data is received in a printer language.

5. The method of claim 3, further including the step of converting the non-form data in the printer language to bit-map data prior to deleting portions of the received non-form data from the designated non-printing regions to form deleted non-form data if the received non-form data is received in a printer language.

6. The method of claim 1, wherein the stored form data may be one of a plurality of form data stored in the printer and wherein the method further includes the step of searching for the identified form data from among the plurality of stored form data, each one of the plurality of stored form data being identical but having a different ID and different designated non-printing regions.

* * * * *